T. Grundmann.
Making Vinegar.

№ 63,508. Patented Apr. 2, 1867.

Witnesses.
Theo. Tusche
Wm Treurn

Inventor.
Th. Grundmann
Munn & Co
Attorneys.

THEODOR GRUNDMANN, OF MILWAUKEE, WISCONSIN.

Letters Patent No. 63,508, dated April 2, 1867.

IMPROVED APPARATUS FOR MAKING VINEGAR.

The Schedule referred to in these Letters Patent and making part of the same.

TO ALL WHOM IT MAY CONCERN:

Be it known that I, THEODOR GRUNDMANN, of Milwaukee, in the county of Milwaukee, and State of Wisconsin, have invented a new and improved Apparatus for Making Vinegar; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

This invention relates to certain improvements on an apparatus for making vinegar, for which Letters Patent were granted to me on the 11th day of September, 1866.

The improvements consist in the construction of the troughs through which the liquid, which is to be transformed into vinegar, is passed. These troughs are placed on a perfect level, and are provided with vertical walls for detaining the liquid in its passage, and by which the same is made to traverse hundreds of feet in a trough of from twelve to twenty feet length. These troughs are placed one above the other, the upper one serving as cover for the one below, thus doing away with the clamps and covers for the troughs mentioned in my aforesaid Letters Patent. The troughs communicate with each other by means of pipes at one end of each trough; each of the said pipes being arranged on the side opposite to that on which the pipe on the trough above is arranged, so that the liquid will have to pass through the whole length of each trough before it can flow into the trough below. For this slow motion of the liquid is arranged a quick motion of air, provision being made that a current of air may pass above the liquid in each trough.

The object of the machine itself is the same as that described in my aforesaid Letters Patent.

Figure 1:
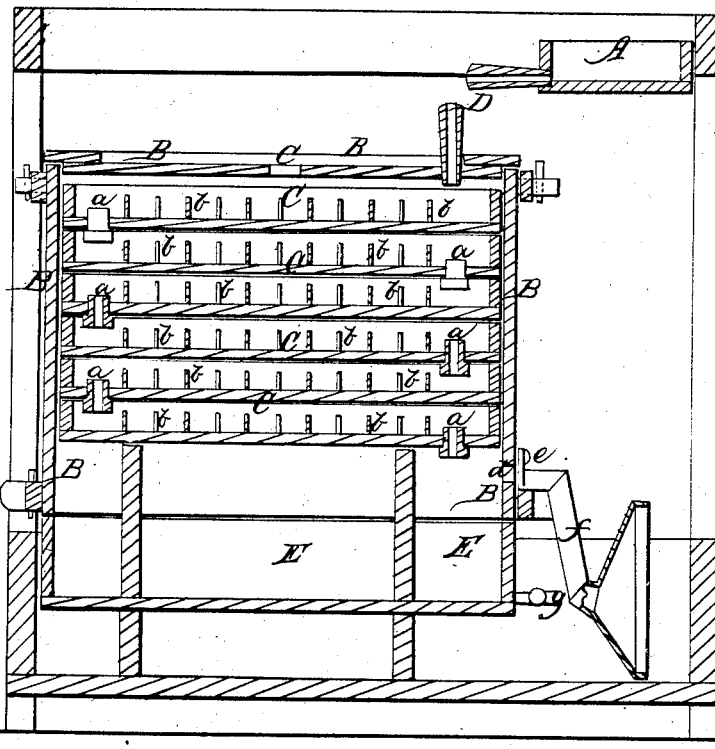
Figure 1 is a vertical sectional view of my improved apparatus.
Figure 2:
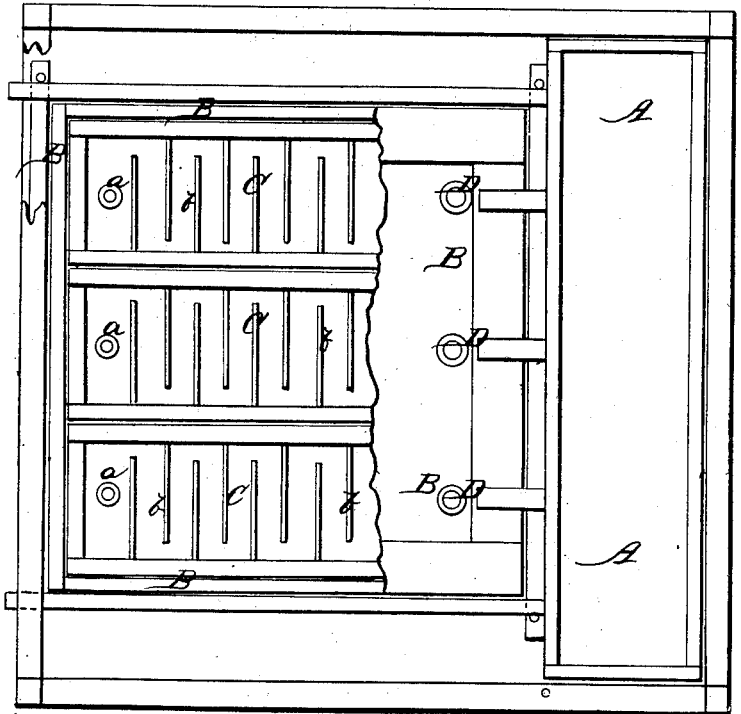
Figure 2 is a plan or top view of the same partly in section.

A represents a flat tank or vat containing the liquid which is to be transformed into vinegar. B is a box, arranged below the vat A and enclosing the troughs C C, for the purpose of retaining the heat in the troughs and regulating the draught of air. The troughs C are laid in series, three or more of which may be arranged in one box B. In each series the troughs are lying perfectly level one above another, communicating with each other by holes, $a$, in the ends of the troughs, as shown; said holes being so arranged that the air rising from below, as well as the liquid entering from above, will have to pass through the whole length of each trough before they can escape into the next trough. Each trough is provided with a series of vertical plates, $b\ b$, (figs. 1 and 2,) which are arranged across the troughs, leaving a space between the end of the plate $b$ and the side of the trough for the liquid to pass through; these spaces being arranged alternately on the opposite side of the trough to let the liquid pass through the trough in a zigzag line. The plates $b\ b$ are not as high as the troughs, for the purpose of not obstructing the passage of the air. The liquid is conveyed from the vat A to the troughs by means of pipes, D, connecting the vat with the cover of the box B, whence the liquid is brought to each series of troughs through a separate pipe. One or more holes, $c\ c$, are provided in the cover of the box B, which, in connection with the holes $d\ d$ in the side or bottom of box B, below the lowest trough, keep up the required circulation of air, which may be regulated by dampers, $e$, arranged at the holes $d$. A pipe, $f$, provided with a funnel-shaped end, serves to convey the heat into the box B. The vinegar is collected from the lowest troughs in a box, E, and may then be drawn off through a pipe, $g$.

By this apparatus the overheating of the air is prevented, as free circulation is provided, but should some of the acid be evaporated, it will be prevented from escaping by the strong current of air, and helps to acidify the fresh liquid which enters the troughs from the vat A. If too much phlegm is formed in the upper troughs, (the lower ones are always clear of the same,) the box B is taken apart, being constructed so that this can be done, and the troughs are then removed and cleaned, and operations may again be commenced instantaneously.

I claim as new, and desire to secure by Letters Patent—

The arrangement of a series of level troughs, C, provided with holes, $a$, through which the liquid to be acidified, and also a current of air, are conducted, and provided further with plates $b\ b$, whereby the liquid is detained and its course lengthened without interrupting the rapid current of air, all made and operating substantially as herein shown and described.

The box B, wherein the aforesaid troughs are placed, said box being so arranged that it may be easily taken apart and put together, and being provided with holes $d$ and $c$ for creating a circulation of air, and with dampers $e$ for regulating the same, all made and operating substantially as herein shown and described.

THEODOR GRUNDMANN.

Witnesses:
 JOHN GREGORY,
 A. ARGUS.